United States Patent [19]

Moore et al.

[11] Patent Number: 5,259,691
[45] Date of Patent: Nov. 9, 1993

[54] COUNTERTOP CLAMPING APPARATUS AND METHOD OF USING SAME

[75] Inventors: John W. Moore, St. Louis, Mo.; Anthony Buonaura, Bluford, Ill.

[73] Assignee: The Swan Corporation, St. Louis, Mo.

[21] Appl. No.: 755,033

[22] Filed: Sep. 4, 1991

[51] Int. Cl.⁵ .................................................. F16B 2/02
[52] U.S. Cl. .................................. 403/402; 403/314; 403/338; 403/407.1; 108/64; 52/584; 52/127.3
[58] Field of Search .............................. 403/401-402, 403/335, 336, 338, 309, 310, 313, 314, 407.1; 248/231.7; 108/64; 297/182; 312/111, 140; 52/584, 60, 127.3, 461, 578-580, 592; 256/54

[56] References Cited

U.S. PATENT DOCUMENTS

| | | | |
|---|---|---|---|
| 719,817 | 2/1903 | Kunze | 403/313 X |
| 1,226,419 | 5/1917 | Turner | 403/405.1 |
| 1,351,366 | 8/1920 | Bowman | 403/309 |
| 1,651,325 | 11/1927 | Bush | 403/401 |
| 1,822,217 | 9/1931 | Hudson et al. | 403/286 |
| 1,919,780 | 7/1933 | Fairbank | 403/286 X |
| 2,829,018 | 4/1958 | Valtri | 52/584 |
| 3,091,487 | 5/1963 | Gallagher et al. | 403/381 |
| 3,165,341 | 1/1965 | Burns et al. | 403/338 X |
| 3,574,449 | 4/1971 | Rosenberg | 52/584 |
| 4,078,754 | 3/1978 | Gould | 256/54 X |
| 4,366,758 | 1/1983 | Brecher | 108/64 |
| 4,409,906 | 10/1983 | Alneng | 108/64 X |
| 4,700,917 | 10/1987 | Dillman | 248/231.7 X |
| 4,802,422 | 2/1989 | Beard | 403/338 X |

FOREIGN PATENT DOCUMENTS

| | | | |
|---|---|---|---|
| 408376 | 1/1925 | Fed. Rep. of Germany | 403/409 |
| 2039108 | 6/1972 | Fed. Rep. of Germany | 52/354 |
| 2361534 | 6/1974 | Fed. Rep. of Germany | 52/354 |
| 626585 | 12/1926 | France . | |
| 125679 | 2/1927 | Switzerland . | |
| 392157 | 9/1965 | Switzerland | 403/338 |
| 2062085 | 5/1981 | United Kingdom | 403/338 |

OTHER PUBLICATIONS

Case Industrual Supply Advertising Brochure, 1988.

Primary Examiner—Randolph A. Reese
Assistant Examiner—Harry C. Kim
Attorney, Agent, or Firm—Kalish & Gilster

[57] ABSTRACT

A countertop clamping apparatus and method for use thereof are described which facilitate installation of a countertop or other shelving constructions, particularly those having a mitered corner. The apparatus includes elongated plates having longitudinal flanges and is fixed to the under surfaces of the countertop sections to be joined. Modified C-clamps connect the flanges for facile tightening by either a right or left handed installer and the apparatus may comprehend a drip catching slat between the elongated plates and seam to be joined for decreasing spills during gluing or otherwise filling of the countertop seam.

15 Claims, 3 Drawing Sheets

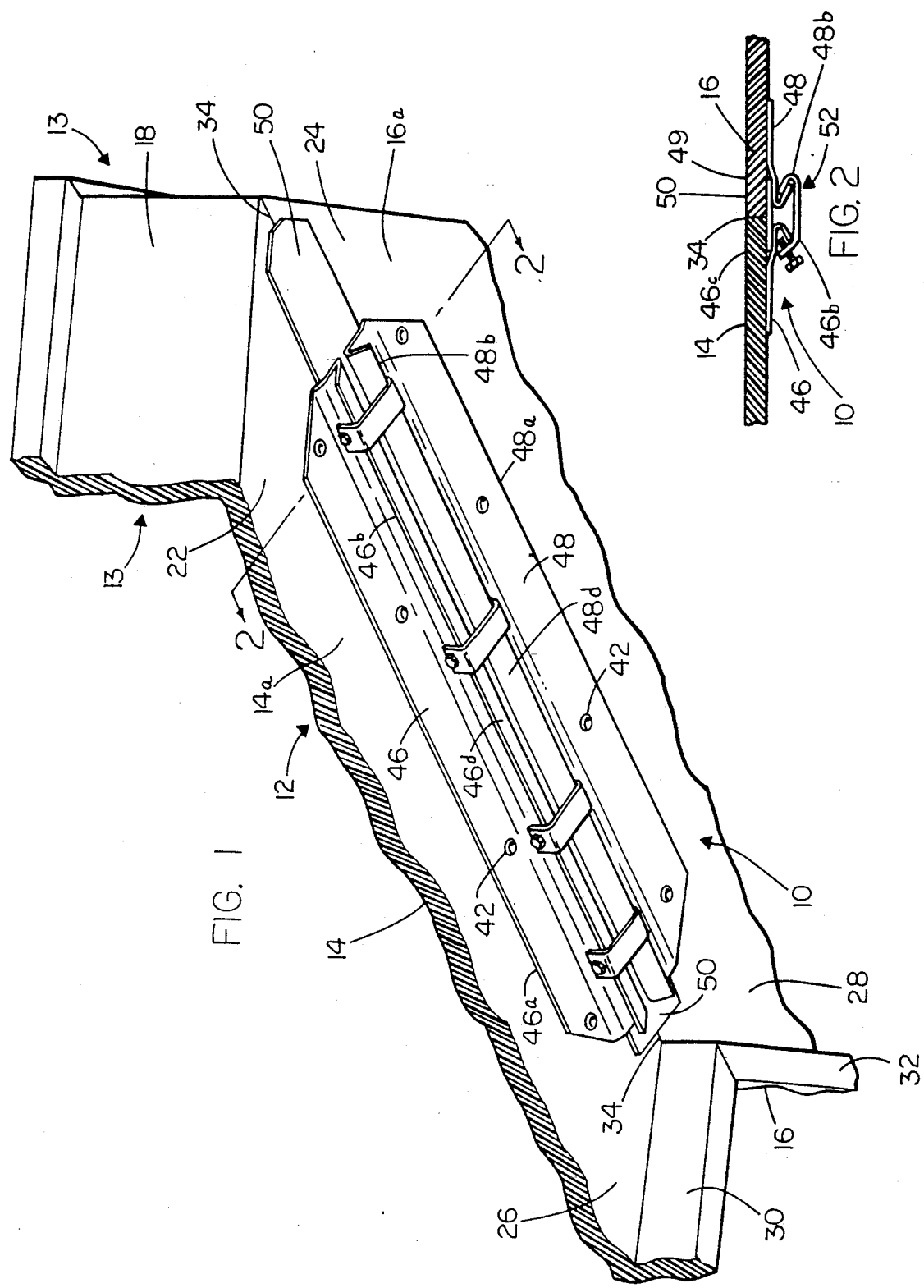

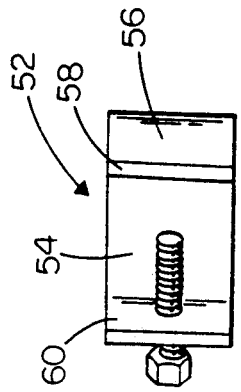
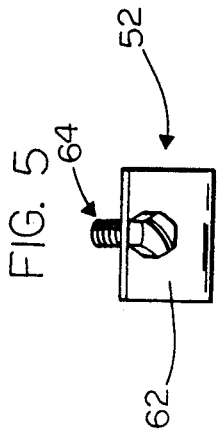
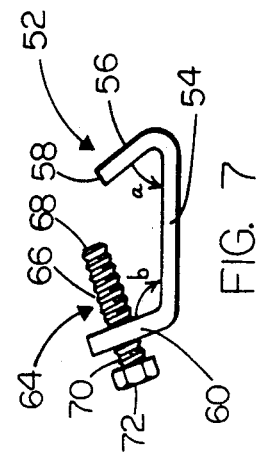
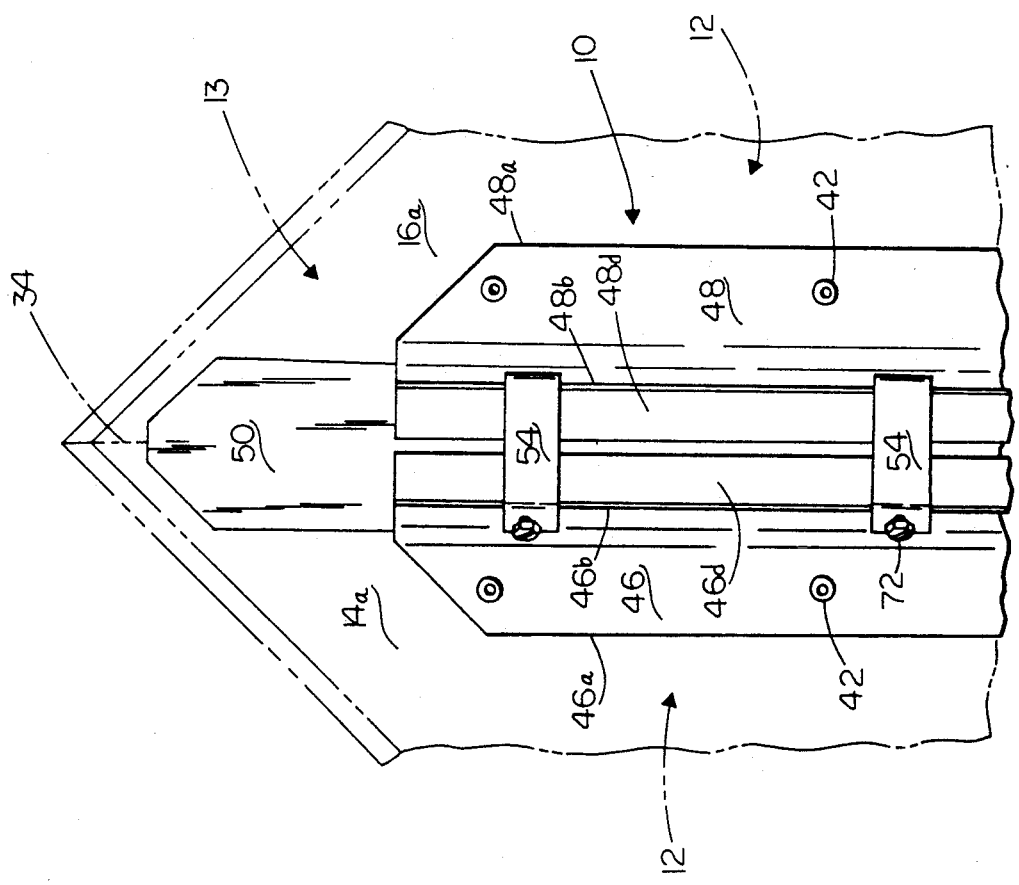

COUNTERTOP CLAMPING APPARATUS AND METHOD OF USING SAME

BACKGROUND OF THE INVENTION

1. Field of the Invention

This invention relates, in general, to devices for connecting adjacent sections of a countertop in position during and after installation thereof as, for example, in a kitchen and, more particularly, to such devices which facilitate installation of a countertop having a miter joint at a corner thereof.

2. Description of the Prior Art

Miscellaneous devices for joining flat pieces end-to-end have been known for some time. For example, U.S. Pat. No. 3,091,487 to Gallagher et al., U.S. Pat. No. 1,822,217 to Hudson et al., U.S. Pat. No. 1,651,325 to Bush and U.S. Pat. No. 1,226,419 to Turner each disclose various metal clips for straddling and retaining two flat pieces in abutting edgewise relationship. In each case, ends of the clip fit into depressions or grooves in the connected pieces. Hudson et al. and Turner also teach connection of the edges of adjoining countertop sections by use of splines embedded in grooves in each of the two pieces.

By contrast, U.S. Pat. No. 1,919,780 to Fairbank teaches a method for coupling two flat pieces, such as shelving, either in a corner, or edge-to-edge by affixing flat elongated brackets with screws to each shelving piece and providing turned flanges along the lengths of such elongated brackets. Adjacently positioned flanges are then connected to each other by a plate which has corresponding flanges and slides over the lips of each elongated flat bracket. The device of Fairbank is not adjustable other than by removing screws which attach an entire elongated flange and reattaching it to the shelve requiring the formation of extra holes in the shelves.

An alternative form of mated flanges is taught by M. Burns et al. in U.S. Pat. No. 3,165,341. That patent teaches a clamping device for connecting two contacting flanges affixed to ends of a two-part piece of equipment such as a cylinder and a head, or a vessel and a cover, or two pipes, and including the combination of a pivot bar carried by a body portion and extending outwardly therefrom as well as a swivel clamp member pivotally connected to the pivot bar.

Another countertop installation method known and marketed under the trademark MIRACLE MITER by Case Industrial Supply, Inc. involves reinforcing the miter joint between two countertop pieces with wooden splines which have been inserted into precut slots having glue placed therein. After placement of the splines and positioning of the countertop sections, the latter are brought into tight alignment by bolts fitted into grooves provided in the joined countertop sections. Such conventional means generally require at least two hands, if not two people, to install the countertops. This is because positioning the bolts necessitates holding the bolt in place with one hand and applying a nut with the other, all the while holding the nut and bolt in place, because the receiving groove therefor on the underside of the conventional countertop is open and will allow the attachments to fall free of the groove. At the same time, the installer is required to work in the very small, cramped corner space beneath the countertop.

Another problem which often occurs with conventional methods of installing countertops is that glue incorporated into the seam between adjacent sections drips through and creates a sticky mess on the inside of a cupboard beneath the countertop. This of course requires extra labor in removing the excess glue from the countertop and the cupboard therebeneath.

Moreover, in conventional countertop installation it has been difficult to form a miter joint at the corner which has a neat appearance and is secure. A miter joint corner is often desired because it requires only one continuous seam. Such "mitered" corners present particular problems, however, because the sharp angles and close working conditions involved generally require professional installation, to be done properly, thus entailing substantial expense. Countertop sections which abut longitudinally end-to-end may be somewhat more satisfactory but still often suffer from the problem of being installed inaccurately such that the multiple joints or seams are unsightly or lack the desired strength once in place. These problems are particularly apparent in older homes which have "settled" such that corners are no longer square. Of course it is also older homes which are most likely to be in need of major repairs such as replacement of countertops in kitchens and bathrooms.

A further consideration in countertop installation is the particular material of which the countertop is made. Different connection devices may or may not work with a particular material. Older countertop materials include, for example, wood surfaced with porcelain tile, particle board covered with formica, or similar substances, or wood in the form of parque or "butcher block". A newer material marketed under the trademark SWANSTONE by the Swan Corporation is a reinforced modified acrylic shelving material which is suitable for types of attachments which do not necessarily function well on the older, known countertop materials. For example, such reinforced modified acrylic shelving material is well suited for receiving and securely retaining pop rivets which do not function well in wood shelving in that they disengage under sufficient pressure. The ability of a manufacturer or installer to successfully use pop rivets in the process of connecting a clamping device to countertop surfaces is a substantial advantage as it is a relatively inexpensive and quick, secure way to achieve the desired results.

SUMMARY OF THE INVENTION

Thus it is an object of the present invention to provide a new and improved apparatus for installing adjoining countertop pieces, particularly so as to form mitered corners, and a method for using same which can be performed by a single individual who is relatively unskilled in the art in an accurate manner using a minimum of tools.

It is a further object of the present invention to provide an apparatus and method of the character stated which result in a clean, neat appearance of the countertop installed therewith, in a facile manner.

It is another object of the present invention to provide an apparatus of the character stated and method of using same which permits fast installation of countertop sections so as to be extremely secure and strong at joints thereof connected by the new countertop clamping apparatus.

It is yet another object of the present invention to provide an apparatus of the character stated and method of using same which may be used for installation of countertops of any usual material, but which is particularly well suited for those formed of reinforced modified acrylic shelving material such as that marketed under the trademark SWANSTONE.

Other objects will be in part apparent and in part pointed out hereinbelow.

Accordingly, in furtherance of the above objects, the present invention is, briefly, an apparatus for clamping connection of adjacent first and second sections of a countertop in abutting end edgewise relationship. The abutting end edges of the first and second countertop sections form a seam therebetween, the seam having a length. The apparatus has a first plate fixed to an underside of the first countertop section and a second plate fixed to an underside of the second countertop section. The first and second plates have opposed inside and outside edges and are fixed to their respective countertop sections so as to be parallel and adjacent to abutting end edges thereof and substantially parallel to the seam. The inside edges of the first and second plates are substantially parallel and adjacent to each other on opposite sides of the seam. The inside edge of the first plate and the inside edge of the second plate each have at least one integrally formed flange which angles downward and away from the countertop section to which the corresponding plate is attached, and at least one adjustable clamping device interconnects the first plate and the second plate by adjustable attachment to the integral angled flanges to thereby connect the first plate to the second plate to permit tightening of the apparatus for bringing the adjacent first and second countertop sections fixed to the first plate and the second plate, respectively, into precise, secured abutting end edgewise relationship.

Also in furtherance of the above objects, the countertop sections to be connected are formed of modified reinforced acrylic material and the plates are fixed thereto by pop rivets.

Furthermore, the first and second plates are elongated and provided with identical lengths shorter than the length of the seam formed by the first and second countertop sections to be connected in abutting end edgewise relationship.

Also, the integral angled flanges are longitudinally coextensive with the entire inside edge of the corresponding elongated plate and the at least one adjustable clamping device is a plurality of adjustable clamping devices positioned spacedly along the integral angled flanges of the first plate and the second plate.

Moreover, the adjustable clamping devices are modified C-clamps having a central body portion having at opposed first and second ends thereof corresponding first and second integrally formed angled arms. The first angled arm angles inwardly toward the central body portion at the first end thereof, and the second angled arm angles outwardly away from the central body portion at the second end thereof. The second angled arm defines an aperture for receiving a screw therethrough. The modified C-clamps are provided with a screw for penetrating the aperture and contacting the angled flange on either the first plate or the second plate, to thereby bring the first and second sections of the countertop into precise, secure, abutting end edgewise relationship.

Also in furtherance of the above objects, the present invention comprehends, briefly, a method of installing a countertop using a countertop clamping apparatus; the method including providing countertop material in first and second countertop sections, each of a predetermined length and to be connected to each other in abutting end edgewise relationship; placing the first and second countertop sections horizontally on a support base so that the respective end edges of the first and second countertop sections to be joined are positioned substantially adjacent to each other; fixing a plate of the countertop clamping apparatus to an undersurface of each of the first and second countertop sections to be joined, such that an angled flange on an inside edge of each of the plates is parallel to the end edge of the corresponding countertop section which is to be joined to another countertop section; attaching adjustable connecting means to the angled flanges of the respective plates fixed beneath the first and second countertop sections to be clamped together so as to connect the first plate to the second plate; and adjusting the connecting means to thereby bring the adjacent first and second countertop sections into precise, secure abutting end edgewise alignment.

The method of the invention further includes, briefly, inserting a slat which is longer than the clamping apparatus into a horizontal slot formed between the undersurface of each of the first and second countertop sections to be joined and the corresponding angled flanges connected thereto, and thereafter introducing into a seam formed between the respective end edges of the first and second countertop sections to be joined a liquid, binding substance to thereby seal the seam. The inserted slat serves to receive and retain any excess liquid binding substance which may leak below the seam.

Also, in keeping with the invention, the first and second countertop sections to be joined are colored and the liquid binding substance is tinted to match the color of the first and second countertop sections to be joined. Thus, the new method includes allowing the liquid binding substance to dry; and sanding the surface of the countertop at the seam to remove any excess liquid binding substance which may have flowed out of and above the seam, to thereby provide a countertop joined by the countertop clamping apparatus and having a neat, smooth appearance.

Moreover, when the countertop material is a modified reinforced acrylic material the step of forming holes at predetermined sites on an undersurface of each of the first and second countertop sections is performed by drilling such holes into the modified reinforced acrylic material. In that case, the fixing of step consists of driving pop rivets through apertures formed in the plates of the countertop clamping apparatus so as to be capable of alignment with the holes drilled into the modified reinforced acrylic material.

BRIEF DESCRIPTION OF THE DRAWINGS

FIG. 1 is a perspective view of a countertop clamping apparatus constructed in accordance with and embodying the present invention in positioned as for normal use on the underside of a mitered corner portion of a countertop.

FIG. 2 is a sectional view taken on line 2—2 of FIG. 1.

FIG. 4 is a partial bottom plan view of the apparatus of FIG. 1 positioned as for clamping a seam of a countertop having a mitered corner and shown in phantom.

FIG. 5 is a plan view of a modified C-clamp of the apparatus of FIG. 1.

FIG. 6 is an end elevation view of the modified C-clamp of FIG. 5.

FIG. 7 is a side elevation view of the modified C-clamp of FIG. 5.

DESCRIPTION OF THE PREFERRED EMBODIMENT

Figure 3:
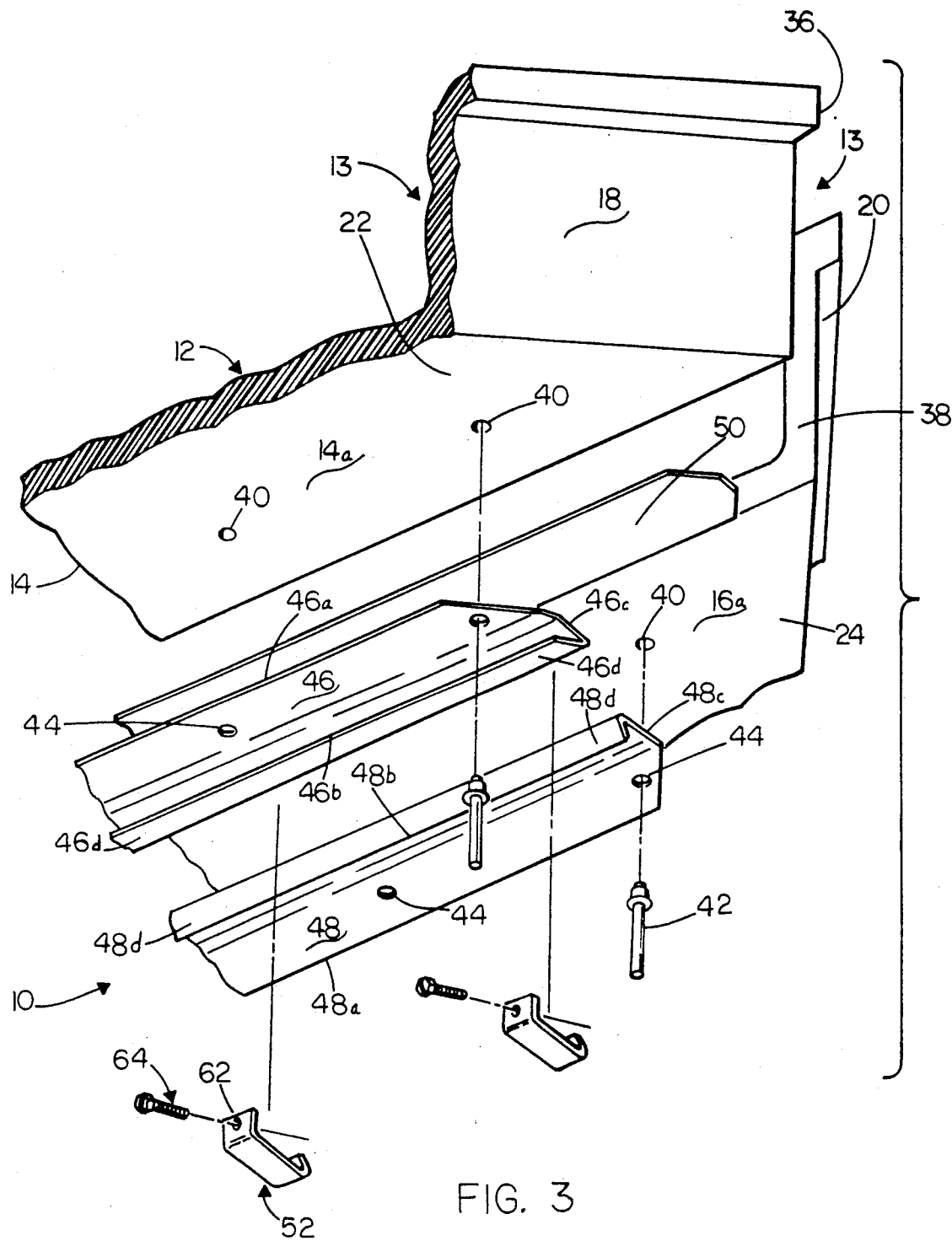
FIG. 3 is an exploded partial perspective view of the apparatus of FIG. 1.

With reference to the drawings, 10 generally designates a countertop clamping apparatus constructed in accordance with and embodying the present invention affixed to a countertop, generally designated 12. FIGS. 1, 3 and 4 illustrate a mitered corner portion 13 of countertop 12, wherein 14 and 16 designate adjacent horizontal countertop slabs (or sections) to be brought into abutting edgewise relation. Vertical splash walls 18, 20 rise rearwardly of slabs 14, 16 shown at the corner ends 22, 24 thereof, and are preferably formed integrally with slabs 14, 16. Also shown at ends 26, 28 forwardly on corresponding slabs 14, 16 are depending integrally formed substantially vertical lips 30, 32 respectively. When slabs 14, 16 are in normal position, as for use, a tight seam 34 is formed between abutting edges 36, 38 thereof.

Countertop 12 is preferably provided with preformed openings 40 in under surfaces 14a, 16a of countertop slabs 14, 16, respectively, for receiving attachment means for affixing countertop clamping apparatus 10, according to the method of the invention, described further hereafter. Countertop 12 is shown and preferably formed of modified reinforced acrylic shelving material for attachment by apparatus 10. However, it may also be manufactured of more conventional materials such as wood or particle board, for example.

FIG. 3 illustrates that where countertop 12 is constructed of the preferred modified, reinforced acrylic shelving material openings 40 serve to receive pop rivets 42 which fix clamping apparatus 10 to countertop 12 by passing through apertures 44, formed at preselected sites along a longitudinal axis of elongated connection plates 46, 48 of apparatus 10 so as to align with openings 40 in slabs 14, 16. Pop rivet attachments 42 are preferably eight in number along each connection plate 46, 48, for strength of attachment, but are shown as only four in the figures, for clarity.

Connection plates 46, 48 are preferably metal and identical in all respects, and thus are interchangeable, but are assigned different numbers for purposes of discussion. It may be readily seen that plates 46, 48 would not of necessity be identical and could conceivably be formed of other material, such as a very tough plastic. Each plate 46, 48 is slightly shorter than the depth of countertop 12 from front to back as shown, as by approximately four to five inches, and is provided with opposed longitudinal edges 46a, 46b and 48a, 48b, respectively (FIGS. 3 and 4).

Edges 46a, 48a preferably lie flat against corresponding countertop slab undersurfaces 14a, 16a when plates 46, 48 are connected thereto. By contrast, edges 46b, 48b are each folded longitudinally back away from each other when in working position and toward corresponding opposed edges 46a, 48a, so as to form angled flange portions 46c, 46d and 48c, 48d, preferably longitudinally coextensive along the entire corresponding longitudinal edge 46b, 48b. Conceivably, edges 46b, 48b can be "broken" so that angled flange portions 46c, 46d, 48c, 48d appear as tab-like projections thereon (not shown).

When pop riveted into position beneath countertop 12, plates 46, 48 are placed such that the respective angled flange portions of edges 46b, 48b are parallel and adjacent but not touching each other on opposed sides of seam 34 such that flange portions 46c, 48c (FIGS. 2, 3) angle slightly downward away from seam 34 and portions 46d, 48d turn outwardly back and slightly further away from seam 34. So positioned, angled flange portions 46c, 48c define an elongated shallow space (horizontal slot) 49 between themselves and the corresponding lower surfaces 14a, 16a of countertop 12 directly beneath seam 34 for receiving a thin slat 50 therein. Slat 50 is preferably slightly longer than plates 46, 48, as by approximately three and one half inches, for example, yet is still shorter than the front to back depth of countertop 12 so as to fit fully therebeneath, as shown in FIG. 1.

In normal functioning position, elongated connection plates 46, 48 are attached to each other by means of modified C-clamps 52 spacedly positioned along the length of angled flange portions 46c, 46d, 48c, 48d and are preferably four in number.

FIGS. 5, 6 and 7 illustrate that modified C-clamps 52 are preferably constructed with a rectangular, flat back portion 54 having at opposed ends thereof and formed relative thereto an inwardly angled arm 56, terminating in an edge 58, and an outwardly angled arm 60 having a central through-hole 62 for passage therethrough of a hex-headed screw 64.

Screw 64 consists of an elongated threaded shaft 66 having opposed ends 68, 70 and a hex-shaped head 72 mounted on end 70. FIG. 7 illustrates that inwardly turned arm 56 of modified C-clamp 52 forms an angle a with base portion 54 and threaded shaft 66 of screw 64, penetrates through hole 62 of outwardly turned arm 60 and forms an angle b with base portion 54 of clamp 52.

Modified C-clamp 52 is sized such that when in working position, back portion 54 straddles adjacently positioned outwardly turned flange portions 46d, 48d of connection plates 46, 48. Placed in normal connecting position upon apparatus 10, and as shown in the figures, modified C-clamp 52 receives elongated connection plates 46, 48 by placement of edge 48b within angle a and placement of edge 46b within angle b, as shown in FIG. 2 so that modified C-clamp 52 is suspended from connection plates 46, 48. In fully tightened position, end 68 of screw 64 is in contact with angled flange portion 46c as illustrated in FIG. 2.

It is to be understood that modified C-clamp 52 is described as attached to and part of apparatus 10 in keeping with the illustrations, but can be attached and function equally well if reversed; that is, if rotated 180 degrees in relation to the position shown. Further, it is preferred that clamp 52 and screw 64 be formed of hardened steel. However, other, weaker materials, not necessarily metal may suffice.

In the preferred method of use it is considered that the space in which countertop 12 will be installed will be measured and slab sections 14, 16 ordered and cut to fit the appropriate length. Thereafter, holes 40 will be predrilled in the under surfaces 14a, 16a of countertop 12 at preselected positions, preferably by the manufacturer or distributor. Elongated connection plates 46, 48 will then be attached,, preferably as by pop rivets 42 so as to be permanently fixed, as previously described, either by the manufacturer, distributor or conceivably by the consumer himself. Pop rivets 42 of course are to be inserted through holes 44 into openings 40 for permanent affixation of connection plates 46, 48. Alternatively, if wood or another substance is used in construction of countertop 12, connection plates 46, 48 may be attached in a similar manner; rather, however, by screws or even nails (not shown), as pop rivets are found to not hold well in materials other than that preferred and previously described.

At the installation site, slabs 14, 16 will be rested upon cabinet bases or other supports with edges 36, 38 facing each other and under surfaces 14a, 16a positioned downwardly. Conventional "wafers", splines, or wooden disks (not shown) will be inserted into preformed slots (not shown) in edges 36, 38 as by the usual means, if desired including glue in such slots. Slabs 14, 16 will then be eased together until edges 36, 38 are in edgewise abutting relationship as accurately as possible, with vertical splash walls 18, 20 adjacent each other and depending lips 30, 32 similarly adjacent each other. So positioned, preattached connection plates 46, 48 will be disposed with angled flange portions 46d, 48d adjacent and parallel to each other, as shown in FIG. 1 flanking seam 34. Slat 50 will preferably then be introduced into space 49 as shown in the exploded view FIG. 3. During all of the above steps, the countertop slabs 14, 16 are in somewhat loose relationship relative to each other and to the countertop base (not shown) to permit slight adjustments in position, as required by the conditions.

In order to provide an extremely smooth, neat appearance to countertop 12, seam 34 is then optionally filled with an epoxy substance which has been tinted to match the color of countertop 12. Slat 50 acts to catch any excess epoxy (or other glue-like material which may be used to permanently seal the seam) which may drip through seam 34, particularly as, during the next step, modified C-clamps 52 are tightened as by inserting a hex-headed screw 64 threadably through aperture 62 and turning same until angled flange portions 46d, 48d are as close as possible to each other and edges 36, 38 are in tight, secure abutting relationship to one another.

Alternatively, slat 50 may be omitted and/or the epoxy or other glue-type substance may also be omitted from seam 34. If such epoxy is used, as preferred, a slight amount of sanding will remove any excess remaining on the upper surface (not seen) of countertop 12 for a very neat, effectively invisible-seamed, strong mitered corner and countertop.

As can be readily seen, the above-described apparatus and method are conducive to installation by amateur "rehabers" as well as by professional carpenters for a precisely fitted mitered corner countertop. The modified C-clamps are easily introduced over angled flange portions 46d, 48d and thereafter tightened with a simple screwdriver or small wrench, all with only the use of one hand, if necessary, as they will not readily drop from their position, being retained therein by flange portion 46d, 48d as previously discussed and illustrated. Moreover, modified C-clamps 52 are just as easily installed by a right-handed or left-handed individual as they may be equally well placed and function with screw 64 directed to either side of seam 34.

Also, having holes (or openings) 40, 42 predrilled at the factory, as preferred, reduces the chances for error by the unskilled installer. Moreover, the described construction of connection plates 46, 48 ensures that they can be installed by the consumer with little chance for error as they may be replaced, one for the other, as by exchanging the plates and rotating them each from the positions shown in FIG. 1, 180 degrees, with equal success, as all holes are preferably equally spaced and plates 46, 48 are in all other respects identical.

In view of the foregoing, it will be seen that the several objects of the invention are achieved and other advantages are attained.

Although the foregoing includes a description of the best mode contemplated for carrying out the invention, various modifications are contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

What is claimed is:

1. An apparatus for secure clamping connection of adjacent first and second sections of a countertop in tight abutting end edgewise relationship, the abutting end edges of the first and second countertop sections forming a seam therebetween, the seam having a length; said apparatus comprising a first plate fixed to an underside of the first countertop section and a second plate fixed to an underside of the second countertop section, said first and second plates having opposed inside and outside edges and being fixed to their respective countertop sections so as to be parallel and adjacent to abutting end edges thereof and substantially parallel to the seam, the inside edges of said first and second plates being substantially parallel and adjacent to each other on opposite sides of the seam, said inside edge of said first plate and said inside edge of said second plate each having at least one integrally formed flange which angles downward and away from the countertop section to which the corresponding plate is attached, and at least one adjustable clamping device interconnecting said first plate and said second plate by adjustable attachment to said integral angled flanges to thereby connected said first plate to said second plate to permit tightening of said apparatus for bringing the adjacent first and second countertop sections fixed to said first plate and said second plate, respectively, into precise, secure abutting end edgewise relationship, wherein said first and second plates are elongated and provided with identical lengths shorter than the length of the seam formed by the first and second countertop sections to be connected in abutting end edgewise relationship by said apparatus, and further wherein said integral angled flanges are longitudinally coextensive with the entire inside edge of the corresponding elongated plate and further wherein the at least one adjustable clamping device is a plurality of said adjustable clamping devices positioned spacedly along said integral angled flanges of said first plate and said second plate.

2. The apparatus of claim 1, and further comprising pop rivets for fixing said plates to the countertop sections to be connected when the countertop sections are formed of modified reinforced acrylic material, and further wherein the underside of each of the first and second countertop sections defines openings for receiving pop rivets, said first and second plates each defining through holes corresponding in position to the openings defined in the underside of the corresponding countertop section for passage through each of said openings of a portion of a pop rivet to thereby permit connected of said first and second plates by pop rivets to the underside of each of the first and second countertop sections.

3. The apparatus of claim 1, wherein the first and second countertop sections to be connected are formed of a substance other than modified reinforced acrylic material, and said first and second plates are fixed to the undersides of corresponding first and second countertop sections by screws.

4. The apparatus of claim 1, wherein said at least one adjustable clamping device is at least one modified C-clamp.

5. The apparatus of claim 4, wherein said modified C-clamps have opposed arms for interconnecting said angled flange of said first plate and said angled flange of said second plate, one of said arms defining an aperture for penetration therethrough by a screw, thereby permitting said modified C-clamps to be adjustable for tight clamping of the adjacent first and second countertop sections in precise, secure abutting end edgewise relationship.

6. The apparatus of claim 1, and further comprising a longitudinal slat having a length at least as long as said plates and positioned slidingly longitudinally beneath the seam formed between the abutting first and second countertop portions and above said parallel flanges formed integrally on the inside edges of said plates, to thereby provide a means for receiving and retaining beneath the seam any liquid, binding substance which may be introduced into the seam for sealing thereof and which may flow therethrough.

7. The apparatus of claim 6, wherein said first and second plates have identical lengths and said slat is at least as long as the length of said first and second plates, but shorter than the length of the seam.

8. An apparatus for secure clamping connection of adjacent first and second sections of a countertop in tight abutting end edgewise relationship, the abutting end edges of the first and second countertop sections forming a seam therebetween, the seam having a length; said apparatus comprising a first plate fixed to an underside of the first countertop section and a second plate fixed to an underside of the second countertop section, said first and second plates having opposed inside and outside edges and being fixed to their respective countertop sections so as to be parallel and adjacent to abutting end edges thereof and substantially parallel to the seam, the inside edges of said first and second plates being substantially parallel and adjacent to each other on opposite sides of the seam, said inside edge of said first plate and said inside edge of said second plate each having at least one integrally formed flange which angles downward and away from the countertop section to which the corresponding plate is attached, and at least one adjustable clamping device interconnecting said first plate and said second plate by adjustable attachment to said integral angled flanges to thereby connected said first plate to said second plate to permit tightening of said apparatus for bringing the adjacent first and second countertop sections fixed to said first plate and said second plate, respectively, into precise, secure abutting end edgewise relationship, wherein the adjustable clamping devices are modified C-clamps comprising a central body portion having at opposed first and second ends thereof corresponding first and second integrally formed angled arms; said first angled arm angling inwardly toward said central body portion at said first end thereof, and the second angled arm angling outwardly away from said central body portion at said second end thereof, said second angled arm defining an aperture for receiving a screw therethrough, and a screw for penetrating the aperture and contacting said angled flange on either said first or said second plate, to thereby bring the first and second sections of the countertop into precise, secure abutting end edgewise relationship.

9. The apparatus of claim 8, wherein of said first plate and said second plate and said at least one adjustable clamping device are formed of metal.

10. A method of installing a countertop using a countertop clamping apparatus; said method comprising:
  (a) providing countertop material in first and second countertop sections, each of a predetermined length and to be connected to each other in abutting end edgewise relationship;
  (b) placing the first and second countertop sections horizontally on a support base so that the respective end edges of the first and second countertop sections to be joined are positioned substantially adjacent to each other;
  (c) fixing a plate of the countertop clamping apparatus to an undersurface of each of the first and second countertop sections to be joined, such that an angled flange on an inside edge of each of the plates is parallel to the end edge of the corresponding countertop section which is to be joined to another countertop section;
  (d) attaching adjustable connecting means to the angled flanges of the respective plates fixed beneath the first and second countertop sections to be clamped together so as to connected the first plate to the second plate; and
  (e) adjusting the connecting means to thereby bring the adjacent first and second countertop sections into tight, precise, secure abutting end edgewise alignment, and further comprising after step (c), inserting a slat which is longer than the clamping apparatus into a horizontal slot formed between the undersurface of each of the first and second countertop sections to be joined and the corresponding angled flanges connected thereto; and before step (e), introducing into a seam formed between the respective end edges of the first and second countertop sections to be joined a liquid binding substance to thereby permanently seal the seam, and the inserted slat to receive and retain any excess liquid binding substance which may leak below the seam.

11. The method of claim 10, and further comprising after step (a) and before step (b), forming openings at predetermined sites on an undersurface of each of the first and second countertop sections substantially adjacent to an end edges of the corresponding section of countertop, which end edges are to be brought into tight abutting end edgewise relationship with each other.

12. The method of claim 11, wherein step (c) is accomplished by driving pop rivets through apertures preformed in said elongated plates to align with the openings formed in the undersurface of each first and second countertop section and simultaneously into the openings formed in the countertop material at predetermined sites.

13. The method of claim 10, and further comprising allowing the liquid binding substance to dry; and sanding the surface of the countertop at the seam to remove any excess liquid, binding substance which may have flowed out of and above the seam, to thereby provide a countertop joined by the countertop clamping apparatus and having a neat, smooth appearance.

14. The method of claim 10, wherein the angled flanges of the plates of the countertop clamping apparatus are longitudinally coextensive with the inside edge of the respective plate and wherein the connecting means are modified C-clamps; and step (d) further comprises attaching a plurality of modified C-clamps spacedly along the angled flanges of both plates such that an angled flange of the plate fixed to the first countertop section is disposed within an angle formed by a first arm of the modified C-clamp and an angled flange of the plate fixed to the second countertop section is disposed within an angle formed by a second arm of the modified C-clamp, the second arm of the modified C-clamp defining an aperture for receiving a screw therethrough; and before step (d), inserting a screw through the aperture of each modified C-clamp second arm; and wherein step (e) comprises tightening the screw received in each modified C-clamp second arm sufficiently to bring the adjacent first and second countertop sections into precise, secure abutting end edgewise alignment.

15. The method of claim 10, wherein the step of forming holes at predetermined sites on an undersurface of each of the first and second countertop sections is performed by drilling such holes into the sections; and the fixing of step (c) comprises driving pop rivets through apertures formed in the plates of the countertop clamping apparatus so as to be capable of alignment with the holes drilled into the sections.

* * * * *